United States Patent Office 3,478,023
Patented Nov. 11, 1969

3,478,023
PYRIMIDO THIADIAZINES
Robert E. Manning, Mountain Lake, N.J., assignor to Sandoz, Inc., Hanover, N.J.
No Drawing. Filed Nov. 30, 1967, Ser. No. 686,828
Int. Cl. C07d 93/22, 51/36; A61k 27/00
U.S. Cl. 260—243                3 Claims

ABSTRACT OF THE DISCLOSURE

This disclosure relates to novel pyrimido[4,5-e]thiadiazines, e.g. 3,5,7 - trimethylpyrimido[4,5-e] - 1,2,4-thiadiazine - 6,8(5H,7H) - dione-1,1-dioxide. These compounds are useful as hypotensives.

---

This invention relates to novel heterocyclic compounds. In particular, this invention pertains to trialkyl pyrimido thiadiazine dione dioxides and to methods for preparing them.

The compounds of the present invention may be represented by the following structural formula

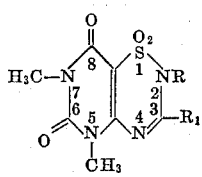

(I)

wherein

R represents H or loweralkyl; and
$R_1$ represents loweralkyl.

By loweralkyl is meant an alkyl group having 1 to 4 carbon atoms, e.g., methyl, ethyl, isopropyl, butyl and the like.

The compounds of Formula I above may be prepared by treating an amino dimethyl uracil sulfonamide of the formula

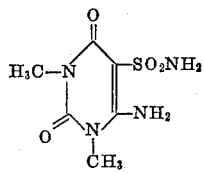

(II)

with a compound of the formula $R_1(COR')_3$ (III) where $R_1$ and R' represents loweralkyl, as previously defined. The R' group of the reactant (III) is selected so as to provide the desired R loweralkyl moiety of the product (I). The process may be represented as follows:

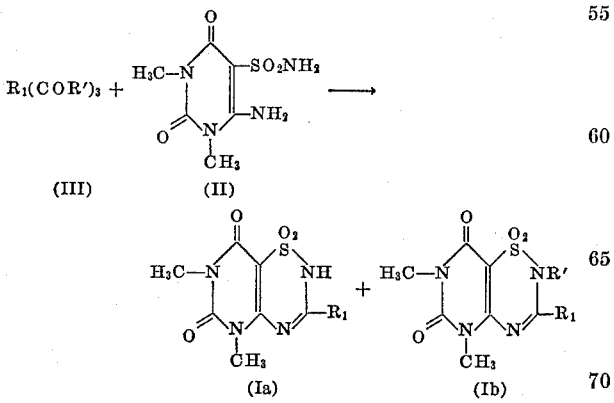

where $R_1$, and R' are as previously defined.

According to the above process, the compounds of Formula II and III are admixed and heated at a temperature of about 90° to 150° C., preferably about 120° to 130° C., for about 2 to 8 hours. Solvents need not be used since one of the reactants may be used in excess. However, the use of such solvents as toluene, xylene and the like may be used as desired. Neither the solvent nor the reaction temperature utilized is critical in the obtaining of the compounds of Formula I. The resulting products (I) are recovered according to conventional recovery techniques such as evaporation, crystallization and the like.

The compound of Formula II and various of the compounds of Formula III are known and may be prepared according to methods described in the literature. Those compounds represented by Formula III which are not specifically disclosed may be prepared by analogous methods from known materials.

The compounds represented by Formula I above are useful because they possess pharmacological properties in animals. In particular, these compounds are useful as hypotensives, as indicated by their activity in anesthetized dogs tested by blood pressure measurement using a mercury manometer or transducer via a catheter inserted in the carotid or femoral artery. When so utlized, the compounds may be combined with one or more pharmaceutically acceptable carriers or adjuvants. They may be administered orally or parenterally and, depending upon the compound employed and the mode of administration, the exact dosage utilized may vary. In general, satisfactory results are obtained when these compounds are administered at a daily dosage of about 1.0 milligrams to about 100 milligrams per kilogram of animal body weight. This daily dosage is preferably administered 2 to 4 times a day, or in sustained release form. For most large mammals, the total daily dosage is from about 100 milligrams to about 1000 milligrams. Dosage forms suitable for internal use comprise from about 25 milligrams to about 500 milligrams of the active compound in intimate admixture with a solid or liquid pharmacetically acceptable carrier or diluent.

A representative formulation suitable for oral administration is a tablet prepared by standard tabletting techniques which contains the following:

| Ingredient: | Parts by weight |
|---|---|
| 2-ethyl-3,5,7-trimethylpyrimido[4,5-e]1,2,4-thiadiazine-6,8(5H,7H)-dione-1,1-dioxide | 30 |
| Tragacanth | 2 |
| Lactose | 59.5 |
| Corn starch | 5 |
| Talcum | 3 |
| Magnesium stearate | 0.5 |

The following examples are provided for the purpose of illustration and not by way of limitation. They are not intended so as to limit the scope of the invention as defined in the appended claims.

EXAMPLE 1

3,5,7-trimethylpyrimido[4,5-e]-1,2,4-thiadiazine-6,8(5H,7H)-dione-1,1-dioxide

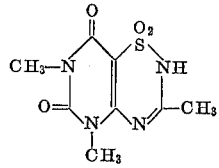

A mixture of 6 - amino - 1,3-dimethyl-5-uracil sulfonamide (18.5 g.) and triethylorthoacetate (56 g.) in an open flask is heated with stirring in an oil bath at 120° for 4 hours. The reaction mixture is triturated with 300 ml. of ether and the resultant solid (17 g.) is collected by filtration. This solid is triturated with 50 ml. of methanol and the mixture filtered to give a solid (A) (10 g.) and a filtrate (B). The solid is refluxed with chloroform for 15 minutes, cooled and filtered to afford 6.0 g. of solid which is dissolved in 200 ml. of hot dimethylformamide. The solution is concentrated to 35 ml. and diluted with 70 ml. of methanol. The resultant crystals are collected by filtration to give 3.5 g. of 3,5,7-trimethylpyrimido[4,5-e] - 1,2,4 - thiadiazine-6,8(5H,7H) - dione-1,1-dioxide; M.P. 250° C.

EXAMPLE 2

2-ethyl-3,5,7-trimethylpyrimido[4,5-e]-1,2,4-thiadiazine-6,8(5H,7H)-dione-1,1-dioxide

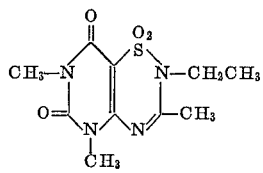

The filtrate (B) from Example 1 is evaporated in vacuo and the residue is crystallized from ether to give 4.1 g. of 2 - ethyl-3,5,7-trimethylpyrimido[4,5-e]-1,2,4-thiadiazine-6,8(5H,7H)-dione-1,1-dioxide; M.P. 138° to 140° C.

What is claimed is:
1. A compound of the formula

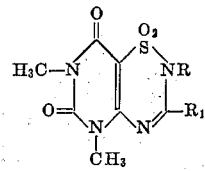

where

R is H or loweralkyl; and
$R_1$ is loweralkyl.

2. A compound according to claim 1 which is 3,5,7-trimethylpyrimido[4,5-e] - 1,2,4-thiadiazine-6,8(5H,7H)-dione-1,1-dioxide.

3. A compound according to claim 1 which is 2-ethyl-3,5,7 - trimethylpyrimido[4,5-e] - 1,2,4-thiadiazine - 6,8-(5H,7H)-dione-1,1-dioxide.

References Cited

UNITED STATES PATENTS 3,270,011   8/1966   Schroeder _____ 260—243
3,303,192   2/1967   Schroeder _____ 260—243

OTHER REFERENCES

Gilow et al.: J. Org. Chem., vol. 28, pp. 1994–8 (1963).

HENRY R. JILES, Primary Examiner

JOHN M. FORD, Assistant Examiner

U.S. Cl. X.R.

424—246